(12) United States Patent
Ye et al.

(10) Patent No.: US 8,106,602 B2
(45) Date of Patent: Jan. 31, 2012

(54) BACKLIGHT ASSEMBLY, DISPLAY APPARATUS HAVING THE BACKLIGHT ASSEMBLY AND METHOD OF PREVENTING A CURRENT CONTROLLER OF THE BACKLIGHT ASSEMBLY FROM BEING SHUT DOWN

(75) Inventors: Byoung-Dae Ye, Yongin-si (KR); Gi-Cherl Kim, Yongin-si (KR); Eui-Jeong Kang, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 502 days.

(21) Appl. No.: 12/264,981

(22) Filed: Nov. 5, 2008

(65) Prior Publication Data

US 2009/0146584 A1 Jun. 11, 2009

(30) Foreign Application Priority Data

Dec. 6, 2007 (KR) .................. 10-2007-0126158

(51) Int. Cl.
*H05B 37/02* (2006.01)
(52) U.S. Cl. .............. 315/294; 315/291; 315/169.3; 315/156; 315/157; 315/158
(58) Field of Classification Search .......... 315/247, 315/224, 225, 185 S, 291, 307–326; 345/102, 345/204, 207, 211–214
See application file for complete search history.

(56) References Cited

U.S. PATENT DOCUMENTS

| 6,717,559 | B2 * | 4/2004 | Weindorf ................... 345/82 |
| 6,841,947 | B2 * | 1/2005 | Berg-johansen ........... 315/169.3 |
| 7,541,785 | B2 * | 6/2009 | Murakami .................. 323/222 |
| 7,598,683 | B1 * | 10/2009 | Jalbout et al. ............... 315/291 |
| 7,663,326 | B2 * | 2/2010 | Santo et al. ................ 315/309 |
| 2002/0130786 | A1 * | 9/2002 | Weindorf ................ 340/815.45 |
| 2007/0171159 | A1 * | 7/2007 | Lee ............................. 345/83 |

FOREIGN PATENT DOCUMENTS

| JP | 11-298044 A | 10/1999 |
| KR | 10-2001-0055888 A | 7/2001 |
| KR | 10-2007-0033277 A | 3/2007 |
| KR | 10-2007-0077719 A | 7/2007 |

* cited by examiner

*Primary Examiner* — Vibol Tan
(74) *Attorney, Agent, or Firm* — Cantor Colburn LLP

(57) ABSTRACT

A backlight assembly includes a light-emitting apparatus, a multi-channel current controller and a heat distributor. The light-emitting apparatus includes a plurality of light-emitting diode ("LED") strings. The multi-channel current controller includes a plurality of current control circuits, each of which includes an input channel electrically connected an LED string of the plurality of LED strings and which controls a magnitude of a driving current flowing through the LED string. The heat distributor is electrically connected to the input channel and the LED string, and is disposed adjacent to the input channel.

20 Claims, 6 Drawing Sheets

BACKLIGHT ASSEMBLY, DISPLAY APPARATUS HAVING THE BACKLIGHT ASSEMBLY AND METHOD OF PREVENTING A CURRENT CONTROLLER OF THE BACKLIGHT ASSEMBLY FROM BEING SHUT DOWN

This application claims priority to Korean Patent Application No. 2007-126158, filed on Dec. 6, 2007, and all the benefits accruing therefrom under 35 U.S.C. §119, the contents of which in its entirety are herein incorporated by reference.

BACKGROUND OF THE INVENTION

1. Field of the Invention

The present invention relates to a backlight assembly. More particularly, the present invention relates to a backlight assembly having a light emitting diode ("LED"), a display apparatus having the backlight assembly and a method of preventing a current controller of the backlight assembly from being shut down.

2. Description of the Related Art

Liquid crystal display ("LCD") apparatuses are typically employed in devices such as monitors, notebook computers, cellular phones and large-screen televisions, for example, because the LCD apparatuses have advantages such as being thin, light weight and having low power consumption compared to other display apparatuses. An LCD apparatus generally includes a display panel and a backlight assembly. The display panel displays an image by controlling a light transmissivity of liquid crystal. The backlight assembly is disposed under the display panel and provides the display with light.

The backlight assembly includes a light source generating light. For example, the light source may include a cold cathode fluorescent lamp ("CCFL"), a hot cathode fluorescent lamp ("HCFL") or a light emitting diode ("LED"). LEDs are largely used as the light source because LEDs have particularly low power consumption and good color reproduction.

In a backlight assembly including the LED as the light source, LED strings of a plurality of LED strings are connected in electrical parallel with each another. At least one current controller is connected to the plurality of LED strings.

The current controller generally compensates for differences among resistances of individual LED strings of the plurality of LED strings, to control driving currents which flow through the LED strings.

However, power consumption of the current controller increases as differences among the resistances of the individual LED strings increase. When the power consumption of the current controller increases, the current controller overheats. As a result, a high-temperature prevention circuit included in the current controller shuts down the current controller.

BRIEF SUMMARY OF THE INVENTION

An exemplary embodiment of the present invention provides a backlight assembly which prevents a current controller thereof from overheating and shutting down.

An alternative exemplary embodiment of the present invention provides a display apparatus having the backlight assembly.

Yet another exemplary embodiment of the present invention provides a method of preventing the current controller of the backlight assembly from being shut down.

According to an exemplary embodiment of the present invention a backlight assembly includes a light-emitting apparatus, a multi-channel current controller and a heat distributor.

The light-emitting apparatus includes a plurality of light-emitting diode ("LED") strings. The multi-channel current controller includes a plurality of current control circuits, each of which includes an input channel electrically connected to an LED string of the plurality of LED strings and which controls a magnitude of a driving current flowing through the LED string. The heat distributor is electrically connected to the input channel and the LED string, and is disposed adjacent to the input channel.

A resistance of the heat distributor may increase as a temperature of a corresponding current control circuit of the plurality of current control circuits increases. In an alternative exemplary embodiment, the resistance of the heat distributor may increase linearly as the temperature of the corresponding current control circuit increases.

In an exemplary embodiment of the present invention, the resistance of the heat distributor increases based on a first gradient when the temperature of the corresponding current control circuit is equal to or less than a critical temperature, while the resistance of the heat distributor increases based on a second gradient larger than the first gradient when the temperature of the corresponding current control circuit is greater than the critical temperature. A value of the critical temperature may be in a range of approximately 70° C. to approximately 100° C.

In an exemplary embodiment of the present invention, the heat distributor may include a positive thermistor having a resistance which increases as a temperature of the positive thermistor increases. In an alternative exemplary embodiment of the present invention, the heat distributor may further include a heat sensor and a resistance changer. The heat sensor senses the temperature of the corresponding current control circuit and controls the resistance changer based on the temperature of the corresponding current control circuit. A resistance of the resistance changer increases as the temperature of the corresponding current control circuit increases.

The backlight assembly may further include a control substrate. The multi-channel current controller and the heat distributor are disposed on the control substrate. The control substrate electrically connects the input channel to the heat distributor.

The control substrate may include a plurality of heat transmission patterns. The heat transmission patterns may electrically connect the input channel to the heat distributor, and may further transfer heat generated by a current control circuits of the plurality of current control circuits from the current control circuit to the heat distributor. The control substrate may further include a plurality of input patterns which transfer the driving current from the light emitting diode string to the heat distributor. Heat transmission patterns of the plurality of heat transmission patterns may have a width which is greater than a width of input patterns of the plurality of input patterns.

Each of the current control circuits may include a current control transistor and a current control operational amplifier electrically connected to the current control transistor. The current control transistor may include an input terminal electrically connected to a corresponding heat distributor via a corresponding input channel and an output terminal electrically connected to ground. The current control operational amplifier compares a reference voltage to a voltage applied to the output terminal of the current control transistor to control the current control transistor based on a result of the comparison.

The backlight assembly according to an exemplary embodiment of the present invention may further include a pulse width modulation controller electrically connected to the multi-channel current controller to generate a plurality of pulse width modulation signals which controls at least one of an on operation and an off operation of the driving current flowing through the LED string. The current controller includes a pulse width modulation switching transistor which controls the at least one of the on operation and the off operation of the driving current based on the plurality of pulse width modulation signals.

The backlight assembly according to an alternative exemplary embodiment of the present invention may further include a voltage changer electrically connected to the plurality of LED strings. The voltage changer receives a voltage from an external device, generates a driving voltage by performing an operation including at least one of increasing the voltage and decreasing the voltage, and supplies the driving voltage to the plurality of LED strings.

The backlight assembly according to another alternative exemplary embodiment of the present invention may further include a driving substrate on which the plurality of light emitting diode strings is disposed.

According to an exemplary embodiment of the present invention a display apparatus includes a display panel which displays an image and a backlight assembly which provides the display panel with light.

The backlight assembly includes a light-emitting apparatus, a multi-channel current controller and a heat distributor. The light-emitting apparatus includes a plurality of LED strings. The multi-channel current controller includes a plurality of current control circuits, each of which includes an input channel electrically connected to an LED string of the plurality of LED strings and which controls a magnitude of a driving current flowing through the LED string. The heat distributor is electrically connected to the input channel and the LED string, and is disposed adjacent to the input channel. A resistance of the heat distributor increases linearly as a temperature of a corresponding current control circuit of the plurality of current control circuits increases.

The heat distributor comprises a positive thermistor, and a resistance of the positive thermistor increases as a temperature of the positive thermistor increases.

According to an exemplary embodiment of the present invention, a method of preventing a current controller from being shut down includes electrically connecting a multi-channel current controller including input channels to a plurality of LED strings, applying a driving voltage to the plurality of light emitting diode strings, applying a plurality of pulse width modulation signals to the multi-channel current controller, and consuming electric power in the multi-channel current controller based on the plurality of pulse width modulation signals using a plurality of heat distributors.

According to an alternative exemplary embodiment, the method further includes electrically connecting the plurality of heat distributors to the plurality of light emitting diode strings and electrically connecting the heat distributors to the input channels. The consuming electric power using the plurality of heat distributors includes increasing a resistance of the plurality of heat distributors as a temperature of the multi-channel current controller increases.

According to exemplary embodiments of the present invention, a heat distributor disposed adjacent to an input channel decreases a temperature of a current control circuit to effectively prevent a multi-channel current controller of the current control circuit from overheating and/or shutting down.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
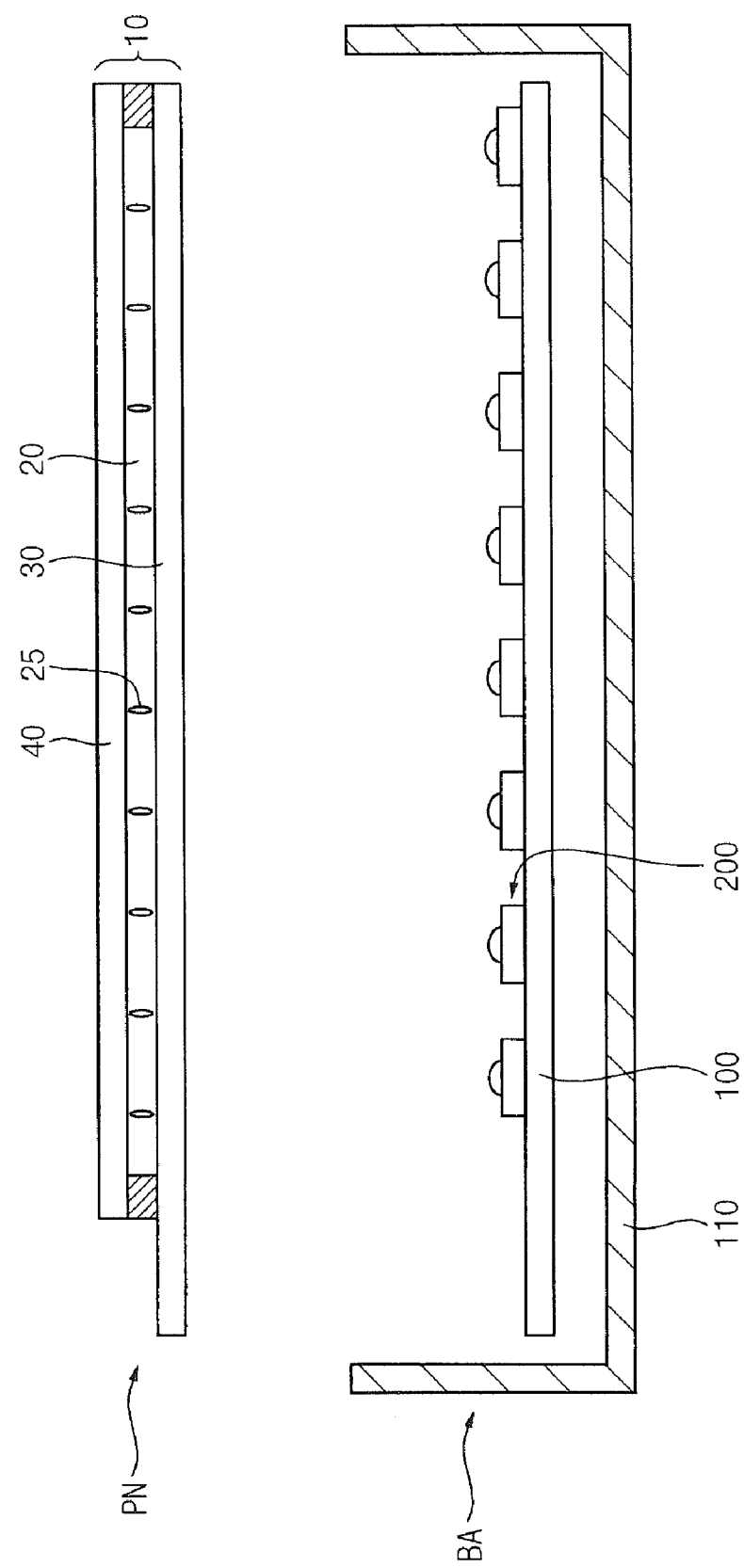
FIG. 1 is a cross-sectional view of a display apparatus according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items. It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

FIG. 1 is a cross-sectional view a display apparatus according to an exemplary embodiment of the present invention.

Referring to FIG. 1, the display apparatus includes a display panel PN and a backlight assembly BA.

In an exemplary embodiment of the present invention, the display panel PN includes a liquid crystal display ("LCD") panel 10 which displays images by controlling a light transmissivity property of a liquid crystal layer 20 based on an alignment of liquid crystal molecules 25 included in the liquid crystal layer 20. When the display panel PN includes the LCD panel 10, the display panel PN may further include a first substrate 30, a second substrate 40 and the liquid crystal layer 20 disposed therebetween, as shown in FIG. 1. It will be noted that alternative exemplary embodiments of the present invention are not limited to the foregoing components or arrangement thereof.

The first substrate 30 includes a plurality of gate lines (not shown), a plurality of data lines (not shown), a plurality of thin-film transistors ("TFTs") (not shown) and a plurality of pixel electrodes (not shown). Data lines of the plurality of data lines cross gate lines of the plurality of gate lines. The TFTs are electrically insulated from the gate lines and the data lines. The pixel electrodes are electrically connected to the TFTs and also include a transparent conductive material.

The second substrate 40 is disposed opposite to, e.g., facing, the first substrate 30. The second substrate 40 includes a plurality of color filters (not shown) and a common electrode (not shown). The color filters of the second substrate 40 are disposed opposite to, e.g., corresponding to, the pixel electrodes of the first substrate 30. In an exemplary embodiment, the color filters include a plurality of red color filters, a plurality of green color filters and a plurality of blue color filters. Further, the common electrode is disposed over an entire surface of the second substrate 40. In addition, the common electrode includes a transparent conductive material and receives a common voltage.

The liquid crystal layer 20 disposed between the first substrate 30 and the second substrate 40. An alignment of the liquid crystal molecules 25 in the liquid crystal layer 20 is determined by an electric field formed between the pixel electrodes of the first substrate 30 and the common electrode of the second substrate 40, so that an amount of light passing through the liquid crystal layer 20 is based on the alignment of the liquid crystal molecules 25. Thus, the display panel PN displays an image using properties of the liquid crystal layer 20 as described above.

Still referring to FIG. 1, the backlight assembly BA is disposed under the display panel PN. The backlight assembly BA provides the display panel PN with light. In an exemplary embodiment of the present invention, the backlight assembly BA includes a driving substrate 100, a light-emitting apparatus 200 disposed on the driving substrate 100 to generate light, and a receiving container 110 receiving the driving substrate 100.

Figure 2:
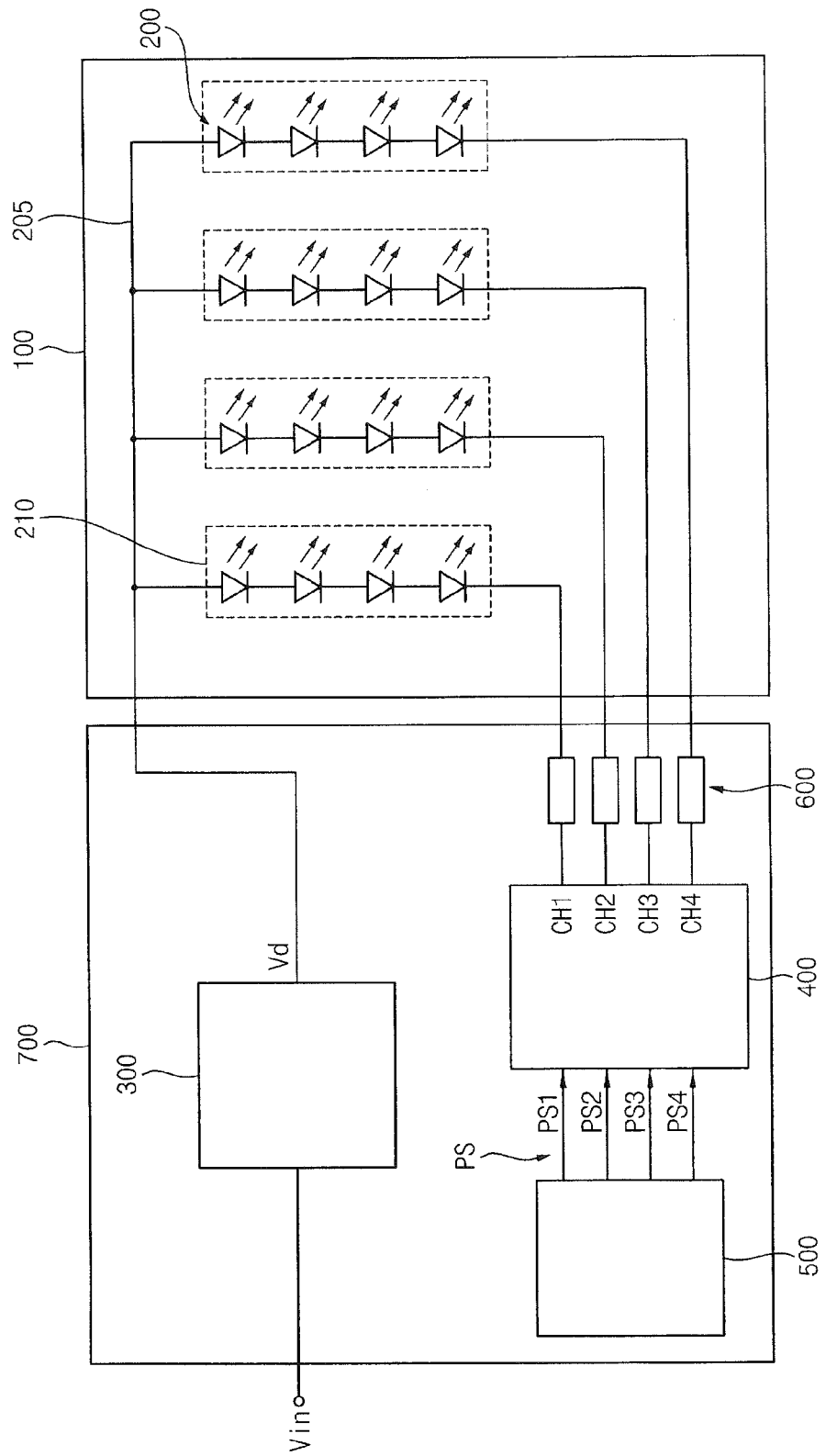
FIG. 2 is a plan view of the backlight assembly according to the exemplary embodiment of the present invention shown in FIG. 1.

FIG. 2 is a plan view of the backlight assembly according to the exemplary embodiment of the present invention shown in FIG. 1.

Referring to FIG. 2, the backlight assembly BA according to an exemplary embodiment includes the driving substrate 100, the light-emitting apparatus 200, a voltage changer 300, a multi-channel current controller 400, a pulse width modulation ("PWM") controller 500, a plurality of heat distributors 600 and a control substrate 700.

In an exemplary embodiment, the driving substrate 100 includes a printed circuit board ("PCB") having a substantially rectilinear shape. Further, the driving substrate 100 includes a plurality of transmission lines 205 through which electric power is transferred to the light-emitting apparatus 200. In an exemplary embodiment of the present invention, the driving substrate 100 may further include a PCB including a single body. In an alternative exemplary embodiment, however, the driving substrate 100 may include a PCB divided into a plurality of bodies electrically connected to one another.

The light-emitting apparatus 200 is disposed on the driving substrate 100 and electrically connected to the transmission lines 205. In an exemplary embodiment of the present invention, the light-emitting apparatus 200 includes a light emitting diode ("LED"), and more specifically, a plurality of LED strings 210.

For example, LEDs 200 of the plurality of LED strings 210 may be arranged in a substantially matrix pattern to form the plurality of the LED strings 210. Alternatively, LED strings 210 of the plurality of LED strings 210 may include a row of the LEDs 200 connected in electrical series to one another. In an exemplary embodiment of the present invention shown in FIG. 2, for example, four LED strings 210, each including 4 LEDs 200, are connected in parallel with one another and are disposed on the driving substrate 100.

In an exemplary embodiment of the present invention, the LEDs 200 include white LEDs which generate white light. In an alternative exemplary embodiment of the present invention, the LEDs 200 may include red LEDs which generate red light, green LEDs which generate green light and blue LEDs which generate blue light, for example, but alternative exemplary embodiments are not limited thereto.

The four LED strings 210 may have substantially equal electric resistances. However, in general, the four LED strings 210 have different electrical resistances from one another. Differences among respective resistances of each of the four LED strings 210 is caused, for example, by individual LEDs 200 having resistances which are different from other individual LEDs 200.

In an exemplary embodiment, the voltage changer 300 adjusts, e.g., increases or decreases, a voltage Vin supplied from an external device (not shown) and applies a driving voltage Vd to the LED strings 210 through the transmission lines 205. Further the voltage changer 300 may include a converter (not shown) which increases a direct current ("DC") voltage of approximately 24 volts ("V") to an increased DC voltage of approximately 40 V and outputs the increased DC voltage to the LED strings 210. IN an exemplary embodiment, the converter is a DC/DC converter.

The multi-channel current controller 400 includes a plurality of input channels electrically connected to the LED strings 210. The multi-channel current controller 400 controls driving currents which flow through the LED strings 210. The driving currents are based on to the driving voltage Vd. For example, the multi-channel current controller 400 may control a magnitude of each driving current. In an exemplary embodiment of the present invention, the multi-channel current controller 400 includes four input channels. Specifically, the four input channels include a first input channel CH1, a second input channel CH2, a third input channel CH3 and a fourth input channel CH4, each of which is electrically connected to an LED strings 210 of the four LED strings 210, as shown in FIG. 2.

In operation, the multi-channel current controller 400 compensates for differences among respective resistances of individual LED strings 210 of the four LED strings 210 to control driving currents which flow therethrough, as will be described in greater detail below with reference to FIGS. 3-7.

Still referring to FIG. 2, the PWM controller 500 is electrically connected to the multi-channel current controller 400 and outputs a plurality of PWM signals PS to control operations, e.g., an on/off operation, of driving currents respectively applied to the LED strings 210.

In an exemplary embodiment, the PWM controller 500 outputs the plurality of PWM signals PS, which includes a first PWM signal PS1, a second PWM signal PS2, a third PWM signal PS3 and a fourth PWM signal PS4, which correspond to the first through fourth LED strings 210, respectively, controlled by the multi-channel current controller 400. The first PWM signal PS1, the second PWM signal PS2, the third PWM signal PS3 and the fourth PWM PS4 applied to the multi-channel current controller 400 control, e.g., the on/off operation of driving currents flowing in the first through fourth through the LED strings 210, respectively.

The heat distributors 600 are electrically connected between the multi-channel current controller 400 and the LED strings 210, as shown in FIG. 2. Specifically the heat distributors 600 are disposed adjacent to the input channels of the multi-channel current controller 400 to decrease temperatures of the input channels of the multi-channel current controller 400.

For example, in an exemplary embodiment of the present invention, four heat distributors 600 are connected to the first input channel CH1, the second input channel CH2, the third input channel CH3 and the fourth input channel CH4, and the first through fourth LED strings 210, respectively. Thus, the four heat distributors 600 are disposed adjacent to each of the first input channel CH1, the second input channel CH2, the third input channel CH3 and the fourth input channel CH4, as shown in FIG. 2.

The voltage changer 300, the multi-channel current controller 400, the PWM controller 500, and the heat distributors 600 may be disposed on the control substrate 700. In addition, the control substrate 700 may be electrically connected to the voltage changer 300, the multi-channel current controller 400, the PWM controller 500 and/or the heat distributors 600.

Specifically, the control substrate 700 may include a voltage supply substrate (not shown) and a current control substrate (not shown). More specifically, in an exemplary embodiment, the voltage changer 300 may be disposed on the voltage supply substrate, and the multi-channel current controller 400, the PWM controller 500 and the heat distributors 600 may each be disposed on the current control substrate, but alternative exemplary embodiments of the present invention are not limited thereto.

Referring again to FIG. 1, the driving substrate 100 on which the light-emitting apparatus 200 is disposed is disposed within the receiving container 10, and the control substrate 700 on which the voltage changer 300, the multi-channel current controller 400, the PWM controller 500, and the heat distributors 600 are disposed may be disposed on the outside of the receiving container 110 such as in a peripheral area thereof, for example. More specifically, the control substrate 700 may be disposed on an external surface of a bottom of the receiving container 110, for example, but alternative exemplary embodiments are not limited thereto.

Figure 3:
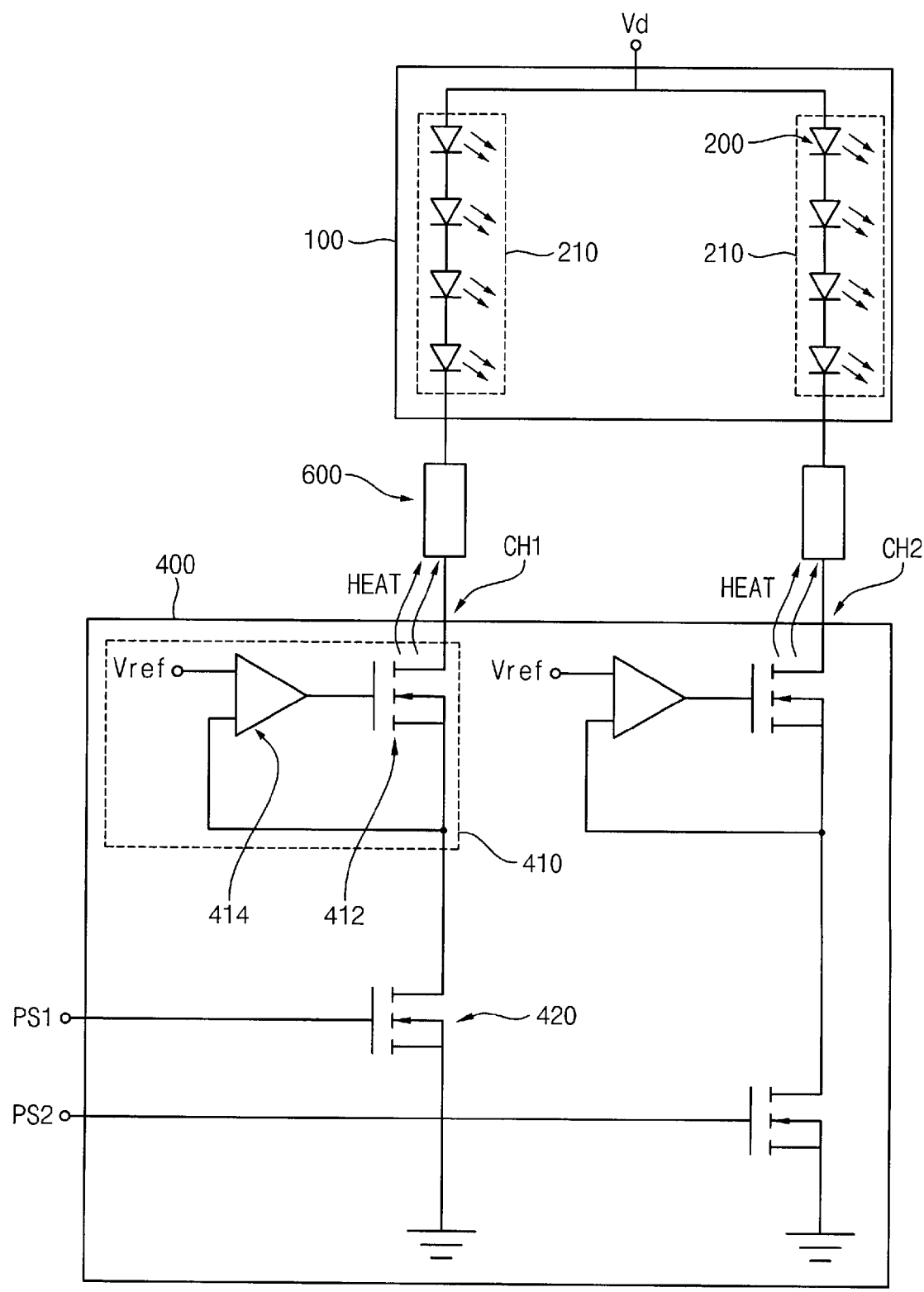
FIG. 3 is a schematic circuit diagram of a light emitting diode ("LED") string, a heat distributor and a multi-channel current controller of the backlight assembly according to the exemplary embodiment of the present invention shown in FIG. 2.

FIG. 3 is a schematic circuit diagram of an LED string, a heat distributor and a multi-channel current controller of the backlight assembly according to the exemplary embodiment of the present invention shown in FIG. 2. More specifically, FIG. 3 illustrates a connection between two LED strings 210. The same reference characters in FIG. 3 refer to the same or like components as in FIGS. 1 and 2, and any repetitive detailed description thereof will hereinafter be omitted.

Referring to FIG. 3, first ends of the two LED strings 210 are electrically connected to the voltage changer 300 (FIG. 2) to receive the driving voltage Vd from the voltage changer 300. Second ends opposite the first ends of the two LED strings 210 are electrically connected to two respective heat distributors 600.

The two heat distributors 600 are electrically connected to the first input channel CH1 and the second input channel CH2 of the multi-channel current controller 400. More specifically, the two heat distributors 600 are disposed at positions adjacent to each of the first input channel CH1 and the second input channel CH2, as shown in FIG. 3.

In an exemplary embodiment, the multi-channel current controller 400 includes a plurality of current control circuits 410 and a plurality of PWM switch transistors 420. In an exemplary embodiment of the present invention, the multi-channel current controller 400 may include two current control circuits 410 and two PWM switch transistors 420 which correspond to two respective heat distributors 600, as shown in FIG. 3, but alternative exemplary embodiments are not limited thereto.

The two current control circuits 410 are electrically connected to the two heat distributors 600 via the first input channel CH1 and the second input channel CH2, respectively. As a result, the two current control circuits 410 independently control respective magnitudes of driving currents which flow through two associated LED strings 210, e.g., the two LED strings 210 shown in FIG. 3.

In an exemplary embodiment, the two PWM switch transistors 420 control on/off operation of the driving currents based on the first PWM signal PS1 and the second PWM signal PS2 generated by the PWM controller 500 (see FIG. 2).

Specifically, the PWM switch transistor 420 includes an input terminal electrically connected to an output terminal of the current control circuit 410, an output terminal electrically connected to a ground terminal and a control terminal electrically connected to the PWM controller 500 (FIG. 2). The control terminal of the PWM switch transistor 420 receives the PWM signal to control the on/off operation of the driving currents which flow through the LED strings 210.

In an exemplary embodiment, each of the two current control circuits 410 includes a current control transistor 412 and a current control operational amplifier 414, as shown in FIG. 3.

Further, an input terminal of each of the current control transistors 412 is electrically connected to a corresponding heat distributor 600 via a respective input channel, e.g., the first input channel CH1 and the second input channel CH2. An output terminal of each of the current control transistors 412 is electrically connected to the input terminal of the PWM switch transistor 420.

Still referring to FIG. 3, a first input terminal of each of the current control operational amplifiers 414 receives a reference voltage Vref. A second input terminal of each of the current control operational amplifiers 414 is electrically connected to a respective output terminal of the current control transistor 412 to thereby receive a sensing voltage outputted from the output terminal of the respective current control transistor 412. The output terminal of the current control operational amplifier 414 is electrically connected to a control terminal of each of the current control transistors 412, such that each current control operational amplifier 414 controls each of the current control transistors 412. More specifically, the current control operational amplifier 414 compares the sensing voltage with the reference voltage Vref to feed back the sensing voltage to the current control transistor 412 such that the sensing voltage approaches the reference voltage Vref. Accordingly, the associated driving currents applied to the respective LED strings 210 are effectively controlled, e.g., are each maintained at a predetermined value.

Thus, the current control transistor 412 serves as a variable resistor which has a resistance controlled by the current control operational amplifier 414. For example, when a driving current applied to each of the LED strings 210 is greater than a reference value, the resistance of the current control transistor 412 is increased, and the driving current therefore decreases. In contrast, when the driving current is smaller than the reference value, the resistance of the current control transistor 412 is decreased such that the driving current increases.

As a result, when individual resistances of each of the LED strings 210 are different from one another, the current control transistors 412 associated with each of the LED strings 210 compensate for the differences between the individual resistances of each of the LED strings 210. Furthermore, when the differences between the individual resistances of the LED strings 210 are large, the current control transistors 412 have resistances which are different from one another to compensate for the large differences between the individual resistances of each of the LED strings 210.

When the individual resistances of each of the LED strings 210 are different from one another, the driving voltage Vd applied to the LED strings 210 is generally adjusted based on the greatest resistance of the individual resistances, for example. As a result, the individual resistances of each of the current control transistors 412 increases to compensate for the differences between the individual resistances of the LED strings 210, and the current control transistors 412 thereby generate heat due and power consumption increases. The heat generated by the current control transistors may become excessive, in which case, a high-temperature prevention circuit (not shown) in the multi-channel current controller 400 shuts down the multi-channel current controller 400. The multi-channel current controller 400 may be shut down at a temperature of about 140° C., for example.

In an exemplary embodiment of the present invention, however, the heat distributors 600 distribute the excessive heat generated from the current control transistors 412. Specifically, resistances of the heat distributors 600 change based on a temperature of the current control circuits 410, and a portion of the electric power consumed by the current control transistors 412 is consumed by the heat distributors 600 instead. Accordingly, in an exemplary embodiment, the temperature of each of the current control circuits 410 is effectively prevented from exceeding a predetermined temperature, e.g., a temperature at which the multi-channel current controller 400 will shut down.

Figure 4:
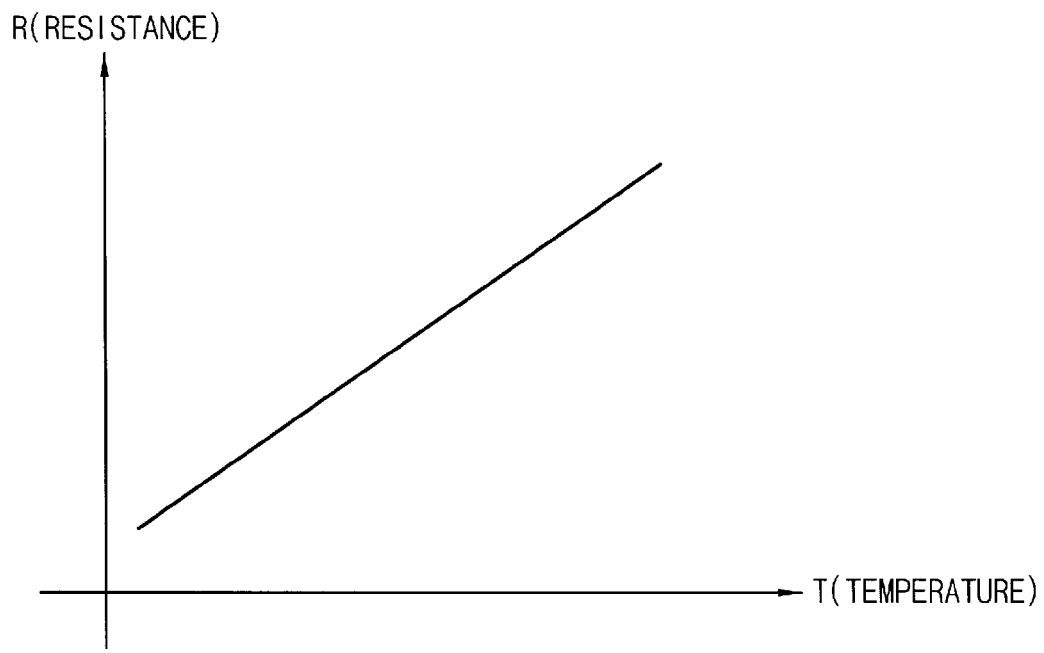
FIG. 4 is a graph of temperature versus resistance illustrating characteristics of a heat distributor according to an exemplary embodiment of the present invention.

FIG. 4 is a graph of temperature versus resistance illustrating characteristics of a heat distributor according to an exemplary embodiment of the present invention.

Referring to FIG. 4, the resistance of the heat distributor 600 increases as a temperature at a position adjacent to an input channel increases. In an exemplary embodiment, for example, the heat distributor 600 includes a positive thermistor a resistance of which increases as temperature increases.

As illustrated in FIG. 4, the resistance of the heat distributor 600 increases substantially linearly with temperature. In an exemplary embodiment, the temperature is a temperature of the current control circuit 410. Thus, when the current control circuit 410 generates excessive heat, the resistance of the heat distributor 600 increases substantially linearly and electric power consumed by the current control transistor 412 in the current control circuit 410 thereby decreases. Accordingly, a temperature of the current control circuit 410 decreases.

In an exemplary embodiment, a resistance of the heat distributor 600 increases to a maximum value of approximately 100 ohms Ω in response to the temperature of the current control circuit 410. As a result, when the driving current applied to each LED string 210 is approximately 60 mA, a maximum value of electric power consumed by each of the heat distributors 600 is approximately 360 mW.

Figure 5:
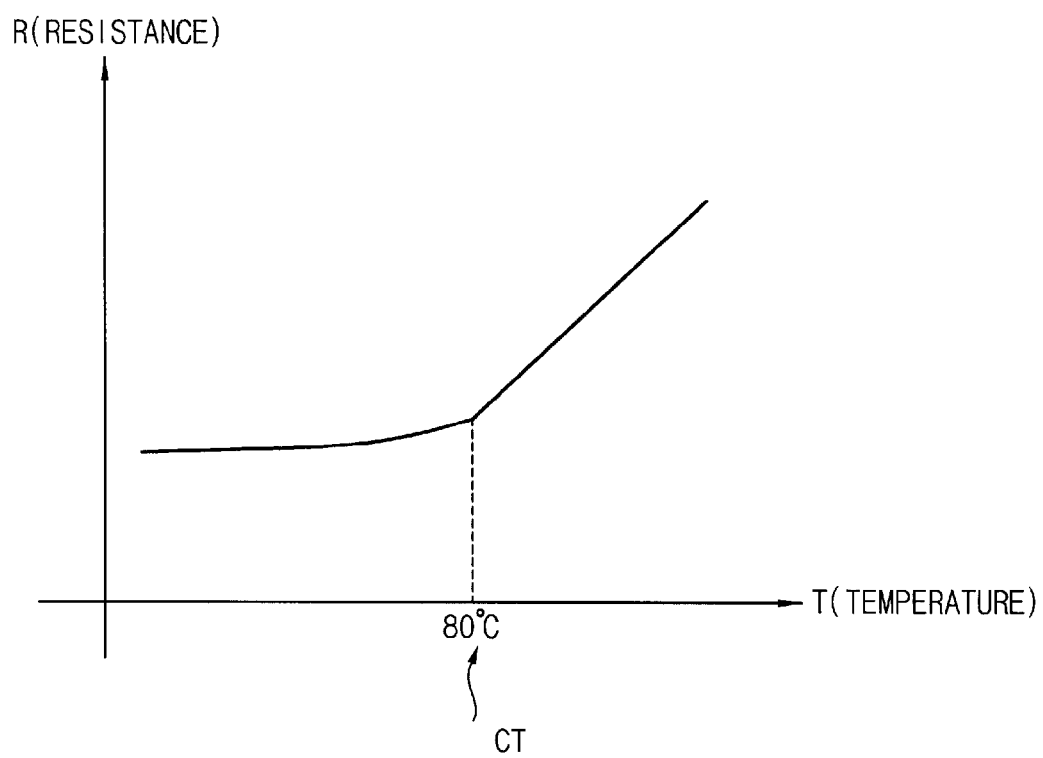
FIG. 5 is a graph of temperature versus resistance illustrating characteristics of a heat distributor according to an alternative exemplary embodiment of the present invention.

FIG. 5 is a graph of temperature versus resistance illustrating characteristics of a heat distributor according to an alternative exemplary embodiment of the present invention.

Referring to FIG. 5, a resistance of the heat distributor 600 according to an alternative exemplary embodiment increases at a first gradient, e.g., rate, as a temperature at a position adjacent to the input channel approaches a critical temperature CT. Thereafter, the resistance of the heat distributor 600 increases at a second gradient, e.g., rate, greater than the first gradient, when the temperature at the position adjacent to the input channel is greater than the critical temperature CT. In an exemplary embodiment, the critical temperature CT is in a range of approximately 70° C. to approximately 100° C. In an alternative exemplary embodiment, the critical temperature CT is approximately 80° C., a shown in FIG. 5.

Before the temperature at the position adjacent to the input channel increases to the critical temperature CT of approximately 80° C., the resistance of the heat distributor 600 increases based on the first gradient, and the multi-channel current controller 400 consumes more electric power than the heat distributor 600. However, when the temperature at the position adjacent to the input channel increases beyond the critical temperature CT of approximately 80° C., the resistance of the heat distributor 600 increases at the second gradient which is larger than the first gradient, and the heat distributor 600 consumes a greater portion of the electric power than that which would have been consumed by the multi-channel current controller 400. As a result, a temperature of the current control circuit 410 of the multi-channel current controller 400 decreases, and the temperature of the current control circuit 410 is effectively prevented from exceeding a predetermined temperature, e.g., a temperature at which the multi-channel current controller 400 will shut down.

Figure 6:
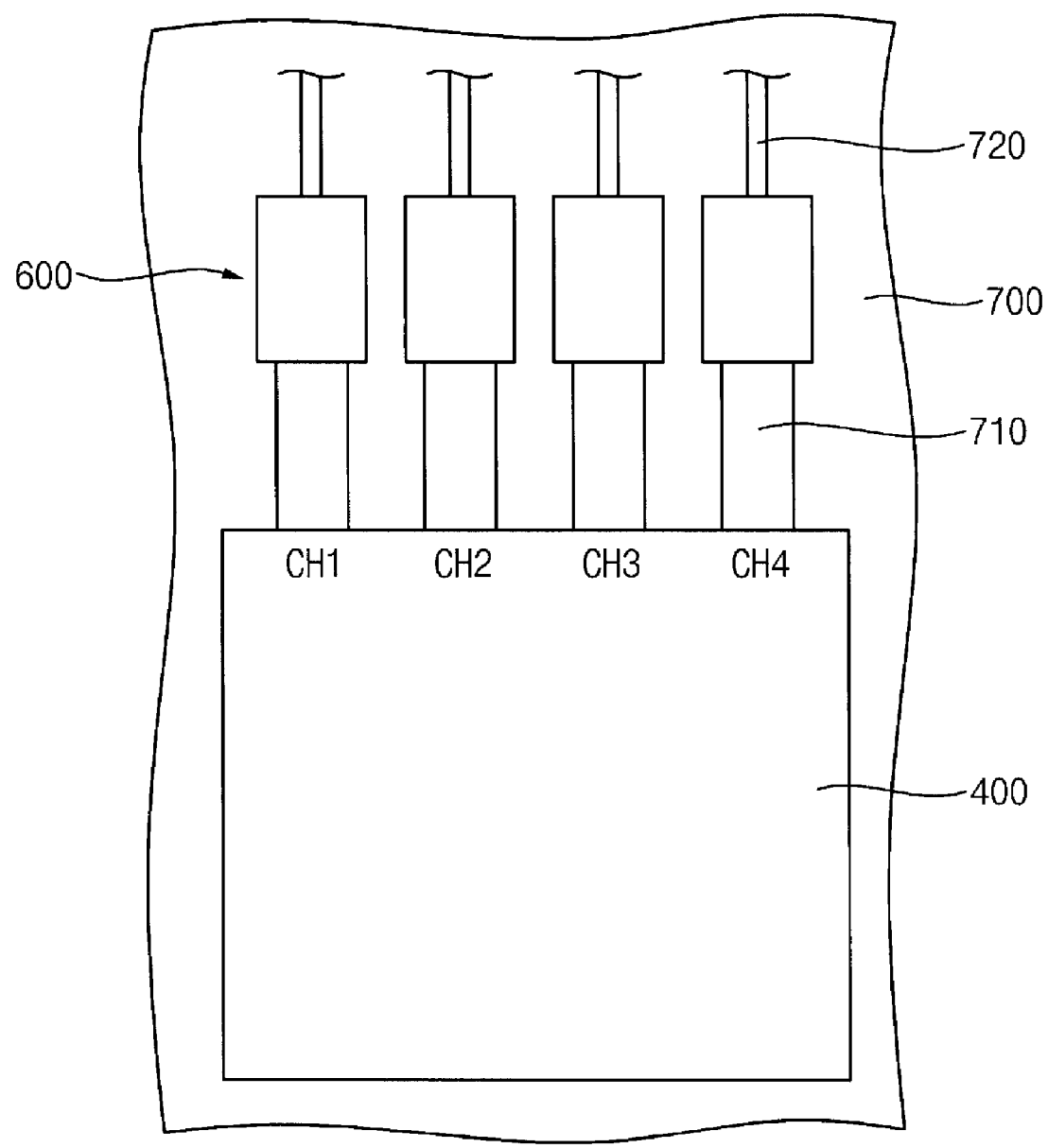
FIG. 6 is an enlarged plan view of a connection between the multi-channel current controller and the heat distributor according to the exemplary embodiment of the present invention shown in FIG. 1.

FIG. 6 is an enlarged plan view of a connection between the multi-channel current controller and the heat distributor according to the exemplary embodiment of the present invention shown in FIG. 1. The same reference characters in FIG. 6 refer to the same or like components as in FIGS. 1 through 3, and any repetitive detailed description thereof will hereinafter be omitted.

Referring to FIG. 6, the control substrate 700 includes a plurality of heat transmission patterns 710 and a plurality of input patterns 720.

Heat transmission patterns 710 of the plurality of heat transmission patterns 710 electrically connect the first input channel CH1, the second input channel CH2, the third input channel CH3 and the fourth input channel CH4 to associated respective heat distributors 600, as shown in FIG. 6. The heat transmission patterns 710 transfer heat generated by the current control circuits 410 (FIG. 3) from the current control circuits 410 to the heat distributors 600. In an exemplary embodiment, the heat transmission patterns 710 include a metal having a high thermal conductivity. More specifically, the heat transmission patterns 710 may include copper (Cu) and/or silver (Ag), for example, but alternative exemplary embodiments are not limited thereto.

Input patterns 720 of the plurality of input patterns 720 transfer driving currents from the LED strings 210 (FIG. 3) to the heat distributors 600.

In an exemplary embodiment, widths of the heat transmission patterns 710 are greater than widths of the input patterns 720, as shown in FIG. 6. As a result, the heat generated in the current control circuits 410 is quickly transferred from the current control circuits 410 to the heat distributors 600, and a resistance of each of the heat distributors 600 sensitively responds to the temperature of each of the current control circuits 410.

Figure 7:
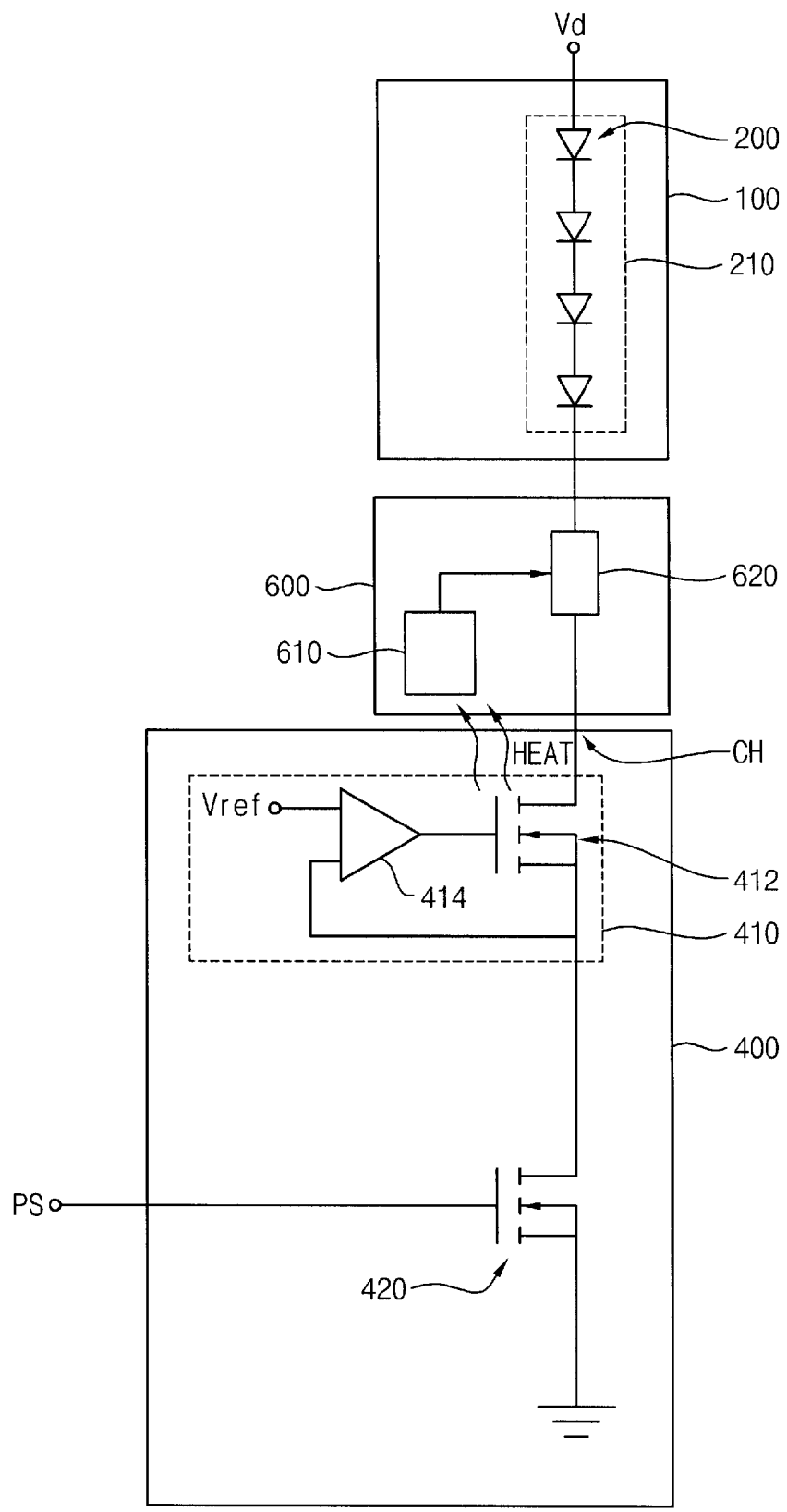
FIG. 7 is a schematic circuit diagram of a backlight assembly of a display apparatus according to an exemplary embodiment of the present invention.

FIG. 7 is a schematic circuit diagram of a backlight assembly of a display apparatus according to an exemplary embodiment of the present invention. The same reference characters in FIG. 7 refer to the same or like components as in FIGS. 1 through 3 and 6, and any repetitive detailed description thereof will hereinafter be omitted. Further, the backlight assembly illustrated in FIG. 7 has substantially the same structure as the backlight assembly illustrated in FIGS. 1 through 3 and 6 except for a structure of heat distributors, as will be now described in further detail.

Referring to FIG. 7, the heat distributor 600 according to an exemplary embodiment includes a heat sensor 610 and a resistance changer 620.

The heat sensor 610 senses temperature at a position adjacent to each input channel CH. Thus, in an exemplary embodiment, the heat sensor 610 is disposed substantially adjacent to, e.g., proximate to, each of the input channels CH to accurately sense the temperature at the position adjacent to each of the input channels CH.

The resistance changer 620 is electrically connected to each of the input channels CH and an associated LED string 210 including the light-emitting apparatus 200, e.g., the LED 200. The resistance changer 620 is controlled by the heat sensor 610 such that a resistance of the resistance changer 620 increases as the temperature at the position adjacent to each of input channels CH increases. In an exemplary embodiment, the resistance changer 620 includes a variable resistor having a resistance which is controlled by the heat sensor 610, as described in greater detail above with reference to FIG. 3.

In an exemplary embodiment of the present invention, the heat distributors 600 distribute heat generated from the multi-channel current controller 400. More specifically, for example, the heat distributors 600 distribute heat generated from the current control transistors 412 of the multi-channel current controller 400.

Because resistances of the heat distributors 600 are varied based on the temperature of the current control circuits 410, the heat distributors 600 absorb a portion of electric power which would have been consumed by the current control transistors 412. Accordingly, the heat distributors 600 effectively prevent the temperature of the current control circuits 410 from increasing to an excessive level, thereby effectively preventing the multi-channel current controller 400 from being shut down.

Hereinafter, a method of preventing the multi-channel current controller 400 from being shut down will be described in further detail with reference to FIGS. 1 through 7.

Referring to FIGS. 1 to 7, the driving voltage Vd (FIG. 2) is applied to the LED strings 210, while the plurality of PWM signals PS is applied the multi-channel current controller 400 having the input channels CH electrically connected to the LED strings 210 via the heat distributors 600. The multi-channel current controller 400 independently controls driving currents flowing through the LED strings 210.

Heat from the multi-channel current controller 400 is distributed from the multi-channel current controller 400 to the heat distributors 600. The heat distributors 600 are electrically connected to the LED strings 210 and the input channels of the multi-channel current controller 400.

The heat distributors 600 are disposed substantially adjacent to, e.g., proximate to, the input channels and absorb the heat generated by the multi-channel current controller 400. In an exemplary embodiment, resistances of the heat distributors 600 increase as the temperature of the multi-channel current controller 400 increases, and the heat distributors 600 thereby consume a portion of electric power normally consumed by the multi-channel current controller 400. As a result, the temperature of the current control circuit 410 of the multi-channel current controller 400 decreases, and the temperature of the current control circuit 410 is therefore effectively prevented from exceeding a predetermined temperature, e.g., a temperature at which the multi-channel current controller 400 will shut down.

According to exemplary embodiments of the present invention as described herein, a multi-channel current controller is prevented from being shut down because heat distributors consume a portion of electric power which would otherwise be consumed by the multi-channel current controller.

The present invention should not to be construed as being limited to the exemplary embodiments set forth herein. Rather, these exemplary embodiments of the present invention are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made to the exemplary embodiments without departing from the spirit and/or scope of the present as defined by the following claims.

What is claimed is:

1. A backlight assembly, comprising:
   a light-emitting apparatus including a plurality of light emitting diode strings;
   a multi-channel current controller including a plurality of current control circuits, each of the current control circuits comprising an input channel electrically connected to a light emitting diode string of the plurality of light emitting diode strings and which controls a magnitude of a driving current flowing through the light emitting diode string; and
   a heat distributor electrically connected to the input channel and the light emitting diode string, and disposed adjacent to the input channel.

2. The backlight assembly of claim 1, wherein a resistance of the heat distributor increases as a temperature of a corresponding current control circuit of the plurality of current control circuits increases.

3. The backlight assembly of claim 2, wherein the resistance of the heat distributor increases linearly as the temperature of the corresponding current control circuit increases.

4. The backlight assembly of claim 2, wherein
   the resistance of the heat distributor increases based on a first gradient when the temperature of the corresponding current control circuit is equal to or less than a critical temperature, and
   the resistance of the heat distributor increases based on a second gradient larger than the first gradient when the temperature of the corresponding current control circuit is greater than the critical temperature.

5. The backlight assembly of claim 4, wherein a value of the critical temperature is in a range of approximately 70° C. to approximately 100° C.

6. The backlight assembly of claim 2, wherein
   the heat distributor comprises a positive thermistor, and
   a resistance of the positive thermistor increases as a temperature of the positive thermistor increases.

7. The backlight assembly of claim 2, wherein the heat distributor comprises:
   a resistance changer; and
   a heat sensor which senses the temperature of the corresponding current control circuit and controls the resistance changer based on the temperature of the corresponding current control circuit,
   wherein a resistance of the resistance changer increases as the temperature of the corresponding current control circuit increases.

8. The backlight assembly of claim 1, further comprising:
   a control substrate on which the multi-channel current controller and the heat distributor are disposed,
   wherein the control substrate electrically connects the input channel to the heat distributor.

9. The backlight assembly of claim 8, wherein the control substrate comprises:
   a plurality of heat transmission patterns, each of which electrically connects the input channel to the heat distributor and transfers heat generated by a current control circuit of the plurality of current control circuits from the current control circuit to the heat distributor.

10. The backlight assembly of claim 9, further comprising a plurality of input patterns which transfer the driving current from the light emitting diode string to the heat distributor,
    wherein a width of each of the heat transmission patterns is greater than a width of each input pattern of the plurality of input patterns.

11. The backlight assembly of claim 1, wherein each of the current control circuits comprises:
    a current control transistor including an input terminal electrically connected to a corresponding heat distributor via a corresponding input channel and an output terminal electrically connected to ground; and
    a current control operational amplifier electrically connected to the current control transistor and which compares a reference voltage to a voltage applied to the output terminal of the current control transistor to control the current control transistor based on a result of the comparison.

12. The backlight assembly of claim 1, further comprising:
    a pulse width modulation controller electrically connected to the multi-channel current controller to generate a plurality of pulse width modulation signals which controls at least one of an on operation and an off operation of the driving current flowing through the light emitting diode string.

13. The backlight assembly of claim 12, wherein the current controller comprises a pulse width modulation switching transistor which controls the at least one of the on operation and the off operation of the driving current based on the plurality of pulse width modulation signals.

14. The backlight assembly of claim 1, further comprising a voltage changer electrically connected to the plurality of light emitting diode strings, wherein
    the voltage changer receives a voltage from an external device,
    the voltage changer generates a driving voltage by performing an operation including at least one of increasing the voltage and decreasing the voltage, and
    the voltage changer supplies the driving voltage to the plurality of light emitting diode strings.

15. The backlight assembly of claim 1, further comprising:
    a driving substrate on which the plurality of light emitting diode strings is disposed.

16. A display apparatus comprising:
    a display panel which displays an image; and
    a backlight assembly which provides the display panel with light, the backlight assembly comprising:

a light-emitting apparatus including a plurality of light emitting diode strings;

a multi-channel current controller including a plurality of current control circuits, each of the current control circuits comprising an input channel electrically connected to a light emitting diode string of the plurality of light emitting diode strings and which controls a magnitude of a driving current flowing through the light emitting diode string; and a heat distributor electrically connected to the input channel and the light emitting diode string, and disposed adjacent to the input channel.

17. The display apparatus of claim 16, wherein a resistance of the heat distributor increases linearly as a temperature of a corresponding current control circuit of the plurality of current control circuits increases.

18. The display apparatus of claim 17, wherein the heat distributor comprises a positive thermistor, and a resistance of the positive thermistor increases as a temperature of the positive thermistor increases.

19. A method of preventing a current controller from being shut down, the method comprising:

electrically connecting a multi-channel current controller including input channels to a plurality of light emitting diode strings;

applying a driving voltage to a plurality of light emitting diode strings providing a display panel and a multi-channel current controller having input channels, each of which is electrically connected to a corresponding light emitting diode string of the plurality of light emitting diode strings; and consuming an electric power in the multi-channel current controller using a plurality of heat distributors disposed adjacent to the input channels.

20. The method of claim 19, wherein consuming the electric power in the multi-channel current controller using the heat distributors is performed by increasing resistance of the heat distributors electrically connected to the light emitting diode strings and the input channels as a temperature of the multi-channel current controller increases.

* * * * *